United States Patent [19]

George et al.

[11] Patent Number: 4,644,532
[45] Date of Patent: Feb. 17, 1987

[54] AUTOMATIC UPDATE OF TOPOLOGY IN A HYBRID NETWORK

[75] Inventors: Frederick D. George, Raleigh, N.C.; Jeffrey M. Jaffe, Monsey, N.Y.; Franklin H. Moss, Concord, Mass.

[73] Assignee: International Business Machines Corporation, Armonk, N.Y.

[21] Appl. No.: 742,812

[22] Filed: Jun. 10, 1985

[51] Int. Cl.$^4$ .................. H04J 3/26; H04Q 11/04
[52] U.S. Cl. ................... 370/94; 340/825.52
[58] Field of Search .......... 370/94, 60; 340/825.52, 340/825, 825.02

[56] References Cited

U.S. PATENT DOCUMENTS

| | | | |
|---|---|---|---|
| 4,317,196 | 2/1982 | Vlug | 370/60 |
| 4,320,500 | 3/1982 | Barberis et al. | 370/94 |
| 4,380,063 | 4/1983 | Janson et al. | 370/60 |
| 4,556,972 | 12/1985 | Chan et al. | 370/60 |
| 4,577,311 | 3/1986 | Duquesné et al. | 370/60 |

Primary Examiner—Douglas W. Olms
Attorney, Agent, or Firm—Pollock, Vande Sande & Priddy

[57] ABSTRACT

The disclosure provides improvements in effecting the routing function in a communication network operating under a distributed control protocol. Selected nodes (control nodes) have extended memory and computing capabilities and each maintains a topology data base, other nodes (ordinary nodes) have more limited memory and computing capabilities and maintain information respecting solely local topology. The method of the invention provides for maintaining the topology data bases in the control nodes current in the face of changes in the network, provides for the selection of a particular control node from which a particular ordinary node will obtain necessary routing information and establishes and maintains communication between the ordinary node and the selected control node. Control nodes identify adjacent control nodes, and upon determining changes in network status, such network status changes are communicated to the adjacent control nodes. When a routing decision is required at an ordinary node, the ordinary node refers to the single control node co-existing in the ordinary node's domain, from which to obtain information necessary for routing purposes.

16 Claims, 19 Drawing Figures

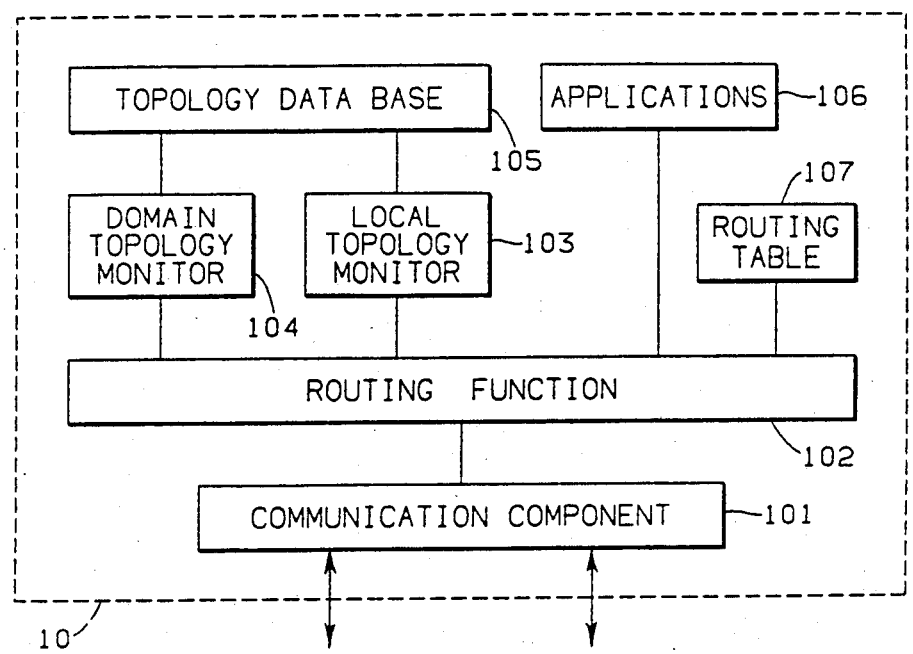
FIG. 2 CONTROL NODE (NC)
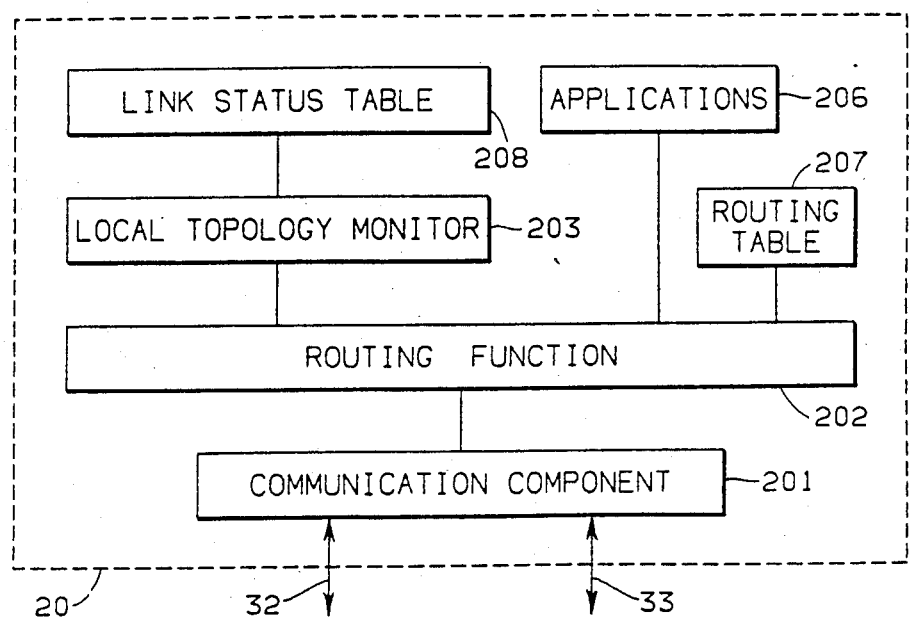
FIG. 3 NNC

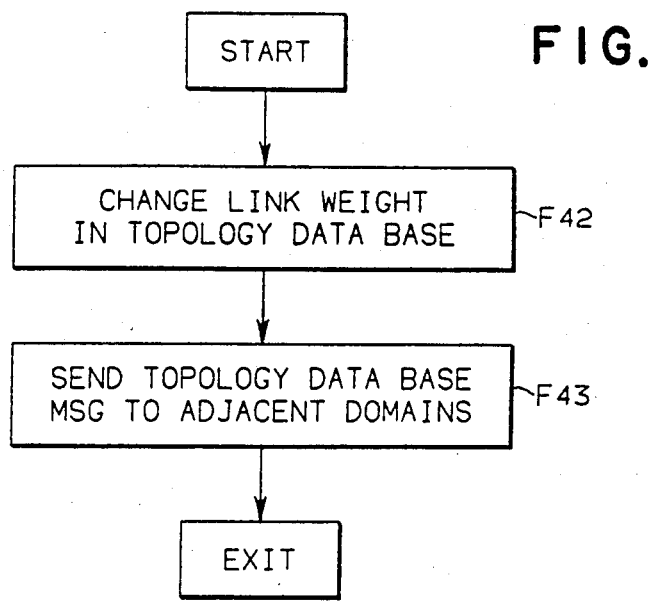
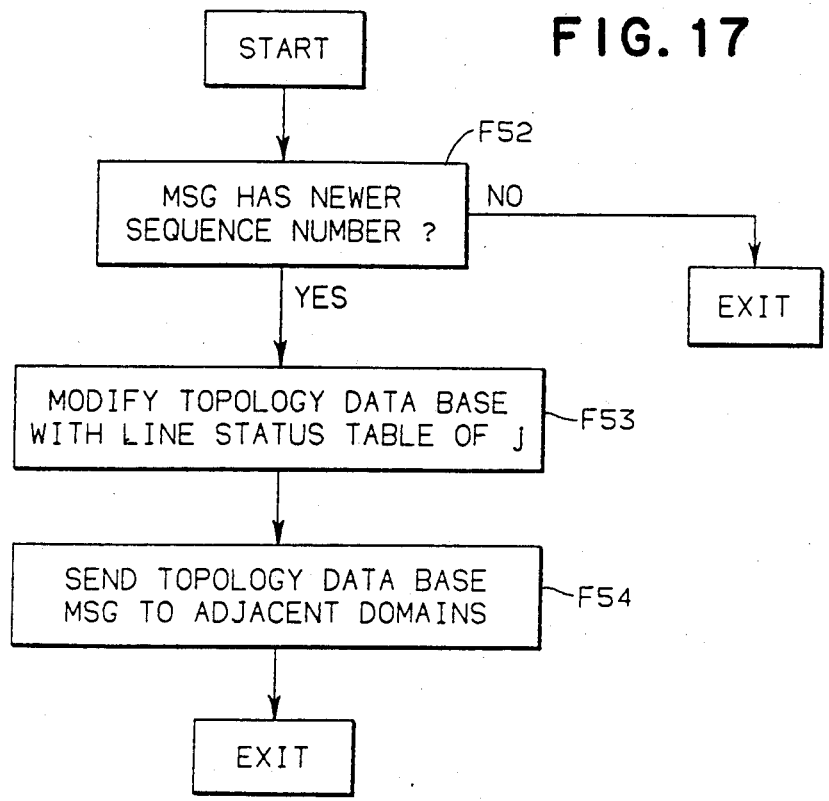

AUTOMATIC UPDATE OF TOPOLOGY IN A HYBRID NETWORK

DESCRIPTION

1. Technical Field

The present invention relates to communication networks and specifically improvements in effecting the routing function of a network using distributed control.

2. Background Art

In large mesh connected communication networks, proper routing of messages so that they efficiently reach a selected destination node presents many difficulties. The function is discussed by Heart et al in "The Interface Message Processor for the ARPA Computer Network" appearing in Vol. 40, *AFIPS Conference Proceedings* (1972) at pp. 551-567, Frank et al in "Topological Optimization of Computer Networks", in *Proceedings of the IEEE*, Vol. 60, pp. 1385-1396 (Nov. 1972), Rudrn in "On Routing and 'Delta Routing'" in *IEEE Transactions on Communications*, Vol. COM-24, pp. 43-59 (Jan. 1976), and Davies et al in *Computer Networks and Their Protocols* (John Wiley & Sons, 1979), see Chapter 3 and in particular pages 109-114. Two competing principles are centralized routing and distributed routing, in the former all routing is effected by a single central authority, whereas in the latter approach route control is distributed throughout the network. The present invention is directed at improvements in distributed control of the routing function.

A communication network typically consists of a plurality of nodes, and communication links (hereinafter "links") interconnecting the nodes. Nodes connected by a single link are considered adjacent. The nodes can act as an information accepting location (origin node), information sink location (destination node) or an intermediate node in passing a message from the origin to the destination. Thus the routing function, to be effected, requires an understanding of the topology of the network. Especially in large networks, the topology of the network is far from constant, the routing function must be capable of operating in an environment wherein nodes are being added and deleted. Such deletions or additions may be the result of expansion or contraction in the network and/or communication failures in a node or a link.

Because the information describing the topology of the network can be extensive, we choose to employ two different types of nodes in the network, a control node (NC) which has extended memory and computing capabilities, and an ordinary node (NNC) which has more limited memory and computing capabilities. To follow the distribution of the resources in the network, we propose that only the control nodes maintain a topology data base (indicative of the present status of the network) and that when an ordinary node requires routing information, that information be acquired from a control node.

The present invention is particularly directed to the solution of three problems that arise in this environment:

1. Maintaining the topology data bases current in the face of changes in the topology or performance characteristics of the network resources,
2. Selection of a particular control node from which a particular ordinary node will obtain necessary routing information, and
3. Establishing and maintaining communication between the ordinary node and the selected control node.

It should be understood that the solution to these problems must survive a dynamic environment in which links and/or nodes (both ordinary and control) may fail (and hence become unavailable) or recover from such a failure (and hence become available).

The Ownership Concept

When an ordinary node wants to communicate to another node in the network, as indicated above, it may have to go to a control node to obtain a route. In addition, if an ordinary node detects a change in its adjacent topology, that information must be communicated to some control node so that the information may be reflected in the topology data bases. Thus any time an ordinary node is up, a "session" called an ownership session should be established between the ordinary node and some control node. However, as described below the existence of an ownership session is not essential at all times. The procedures in the various nodes are biased to complete an ownership session if at all possible.

The collection of ordinary nodes connected at a given time by sessions to a particular control node, N, is referred to as N's domain and each such ordinary node is said to be owned by N. Whenever a new ordinary node comes up, an ownership session to some control node should be established by the following procedure, and the ordinary node will thereby join the corresponding domain.

The procedure for setting up ownership is in principle as follows: when ordinary node i first comes up or loses its owner because of an outage of a pre-existing ownership session, the ordinary node i informs its neighbors or adjacent nodes (nodes directly connected to node i, whether control nodes or ordinary nodes) about this fact. If the neighboring ordinary nodes are owned, they communicate the information to their own owners, who in turn attempt to establish an ownership session with the ordinary node i. That attempt is implemented by the owner's transmitting a request for ownership (or an invitation) to the ordinary node i. The route for such message is first the ownership session between an NC and the neighboring node and second the link between the neighboring node and ordinary node i. The ownership request message which first arrives at the ordinary node i is selected as the successful one. If on the other hand a neighbor j of the ordinary node i is not owned, j saves knowledge of the fact that the ordinary node i is not owned, so that subsequently if j becomes owned, j transmits to its new owner the fact that the ordinary node i is unowned. Note that a domain may well include more than the nodes adjacent the control node.

The Virtual Network

The various topology data bases of the network need accurate information about the current status of the network. Consequently, when a topological change occurs in the form of a failure or recovery of nodes and links, such information must be transmitted to all control nodes. In order to achieve this with a relatively small load on the network, we define a virtual network of control nodes.

The nodes in this virtual network will consist of all the control nodes. The links of the network (virtual links) are sessions in the original network connecting certain pairs of control nodes. Pairs of control nodes connected by virtual links are called virtual neighbors and the broadcast of topological information will propagate only on the virtual network (once the information reaches the first control node).

The topology of the virtual network, namely what control node should be defined as virtual neighbors and connected by virtual links, is essentially arbitrary, so long as the virtual network remains connected. Our choice for the topology of the virtual network is as follows. The domain of control node N is defined as the collection of all nodes owned by N. Two control nodes will be connected by virtual links if their corresponding domains are contiguous (there is at least one link connecting a node in one of the domains to a node in the other domain). This choice guarantees that all control nodes within a connected network will be connected in a virtual network. Thus, the virtual neighbors are virtually adjacent (connected by a single link).

We now describe how the control nodes know when and where to set up sessions to their virtual neighbors. Each control node knows the identity of other control nodes that should be its virtual neighbors through the ownership protocol. In particular, each control node learns the name of the owner of any node contiguous to its domain. To physically set up the session, additional protocols are needed. If the control node would have enough topology information to determine an entire route to the target node, it could simply set up the route. However, in certain cases (for example at network start up), the control node does not in fact have sufficient route information. This occurs for example when a first control node finds out that a second control node must now become a virtual neighbor as a result of two ordinary nodes in the different respective domains becoming connected by a new link, or though a change in ownership. In that case, the first control node may have been previously disconnected from the second control node and does not have sufficient information to determine the route to the second control node. Nevertheless, the definition of the virtual network insists that somehow the first and second control nodes must get into a session to share information on their previously disconnected network components. To overcome this problem, a route can be established between the first and second control nodes by concatenating the different ownership sessions. For example, if you assume that a first ordinary node is in the domain of the first control node, and a second ordinary node is in the domain of the second control node, then necessarily the first control node has an active (ownership) session with the first ordinary node, and the second control node has an active (ownership) session with the second ordinary node. Furthermore, the requirement for communication between the first and second control nodes arises as a result of a new link between the first and second ordinary nodes. Therefore a route between the first and second control nodes exists by concatenating the route of the ownership session between the first control node and the first ordinary node, the new link between the first and second ordinary nodes, and the route of the ownership session between the second control node and the second ordinary node.

TOPOLOGY UPDATE PROCEDURE

The status of the network includes both its connectivity and an efficiency or capacity factor (weight) assigned to each of the links. Information reflecting changes in topology and/or weight must be reported to the control node so that the topology data base of the control node will provide an accurate reflection of the present status of the network. This is performed as follows: whenever a node senses a change in an adjacent link or when an ordinary node gets a new owner, the node reports the status of all its adjacent links and their weights to the owner, the message including a time stamp from the transmitting node. Whenever a control node receives such a message from an owned node k, the control node updates the topology by replacing the list of links adjacent to the node k in its topology data base with the new list. The topology update is performed in the same manner when the control node itself senses an adjoining topological or weight change. After the control node has updated its own data base, it proceeds to inform all other control nodes about the new status via a broadcast protocol by sending a broadcast message with the information to each neighbor on the virtual network. Whenever a node on the virtual network receives such a broadcast, it checks its topology entry for the node k. If the time stamp in the message is less than or equal to the current time stamp stored for the node k, the broadcast message is discarded. Otherwise the receiving control node changes its topology table entry and proceeds to transmit the identical message to all of its virtual neighbors except the virtual neighbor from which it received the message. In certain cases, parts of the virtual network may not get certain information from the broadcast protocol. This may happen if the network becomes temporarily disconnected or due to delays in establishing virtual links. This is overcome by requiring every control node to exchange topology tables with each new virtual neighbor or with a virtual neighbor to which it temporarily did not have a virtual link, and to broadcast the parts of the topological data base that are not identical.

BRIEF DESCRIPTION OF THE DRAWINGS

The present invention will now be described in further detail in the following portions of the specification when taken in conjunction with the attached drawings in:

FIGS. 2 and 3 are block diagrams of a typical control and ordinary node, respectively;

FIGS. 12–18 are processes effected at a control node in response to various conditions in an implementation of the present invention.

DETAILED DESCRIPTION OF PREFERRED EMBODIMENTS

A communication network includes nodes and links, and a communication network with which this invention is concerned is an arbitrary mesh connected hybrid network. The network is a hybrid in that it includes at least two different types of nodes, control nodes (NC) each of which has extended memory and computing capabilities, and ordinary nodes (NNC), with more limited memory and computing capabilities. Both the control and ordinary nodes are general or special purpose computers with memory for data bases, logic and communication capabilities. In addition to executing network operations, these computers may also have user applications running, which user applications may or may not have any application to the network. All the nodes in the network play some part in routing some messages from an origin to a destination node. The minimal function required of ordinary nodes is, on receipt of a message destined for a node other than itself, to acquire sufficient information to select a particular link associated with a particular neighboring node on which to transmit the message. The control nodes are the resource to which an ordinary node applies in order to obtain information necessary for routing. The manner in which an ordinary node selects a particular control node from which to obtain this information, the manner in which the changing status of the network is reflected in a data base maintained in a control node, and the manner in which information contained in the data bases of plural control nodes is distributed, is particularly described hereinafter.

Figure 1:
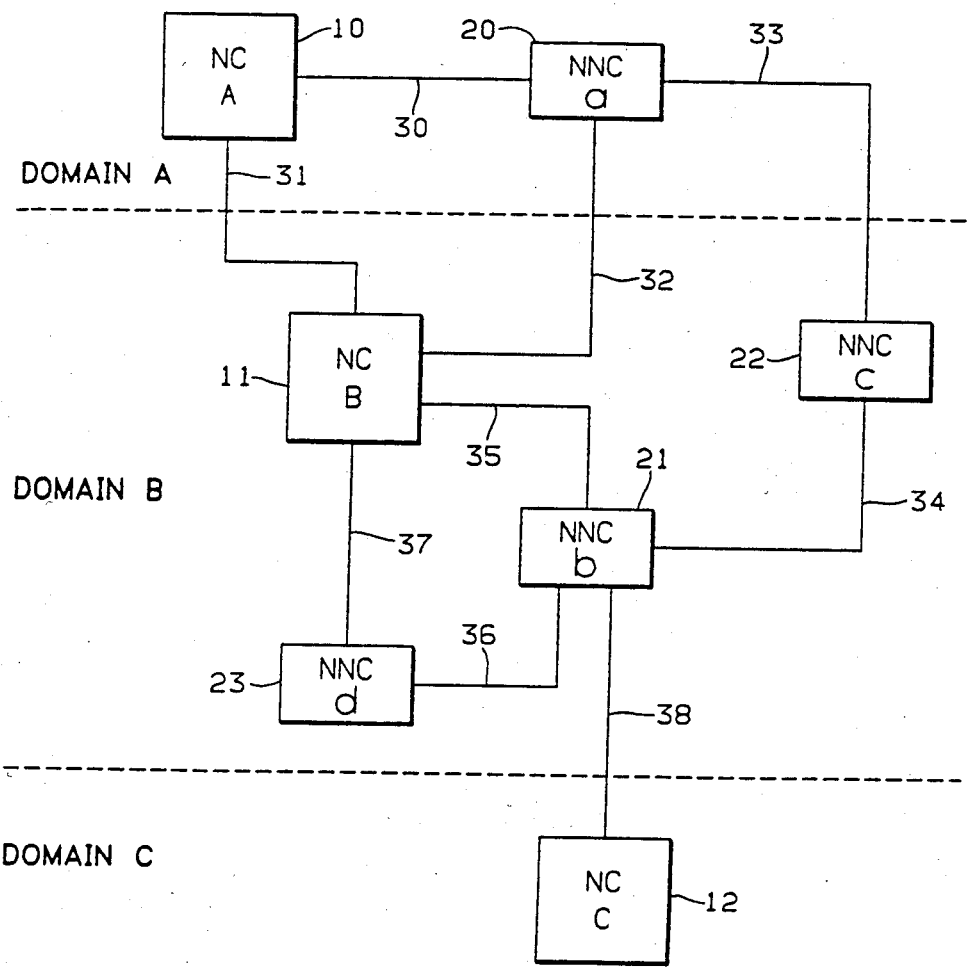
FIG. 1 is a block diagram of a typical hybrid communication network in accordance with the invention.

FIG. 1 depicts a typical communication network including control nodes, ordinary nodes and links interconnecting the same. The links have certain characteristics associated with them and the degree to which any link has the characteristics is collectively referred to as its weight (W). Changes in the characteristics of a link are reflected as a corresponding change in its weight. FIG. 1 shows control nodes A, B, C, and ordinary nodes a, b, c, d (control nodes are designated in upper case as well as by the designator NC, ordinary nodes are designated in lower case and the designator NNC). The purpose of a network such as is shown in FIG. 1 is to allow users to exchange information. That exchange can be in the form of packets. Thus in FIG. 1 an application in NC A can exchange packets with an application in NNC b.

Since NC A is not directly connected to NNC b by any single communications link, any packets originated within NC A destined for NNC b (and vice versa) must traverse other nodes in the network. Each intelligent node in the network (both NCs and NNCs) are capable of forwarding messages not originated by them to the correct destination. This is accomplished through a routing table in each node.

Each NC in a network maintains a topology data base, which contains its understanding of the nodes and connections in the network. From this topology data base, an NC can determine the series of nodes (called a path) between any two nodes which could support the exchanges of packets. Once a path has been determined, the routing tables in each node along the path are updated to support routing packets along the path. FIG. 2 depicts the typical structure of a NC. Each NC has communications component 101, packet routing function 102 which uses a routing table 107, and optional applications 106. In addition, the topology data base 105 is maintained from the status of the local topology monitor 103 and from information from other nodes in the network (as will be described).

FIG. 3 shows a typical NNC. Each NNC retains only local information about its own links and adjacent nodes in a link status table 208. Like a NC, a NNC has a communications component 201, packet routing function 202, and a routing table 207. However, the NNC only gathers local topology information for its link status table 208.

The communication component 101 or 201 has the function of accepting a message for transmission from a particular application and transmitting the message on a link in an appropriate format for transmission. It also has the function of receiving a message in the transmission format and altering the format to make the message available to a particular application. The communication component 101 or 201 also selects a particular link based on information from the routing function 102 or 202. The communication componeht is also responsible for reporting on changes in status of any connected link. The communication component 101 or 201 is wholly conventional and is not described further herein.

The routing function 102 or 202 accesses the associated routing table 107 or 207 to determine a particular link on which to transmit for the message to reach a desired destination. Inasmuch as the routing function is wholly conventional, aside from the manner in which routing data is obtained, it is not further described. The routing table 107 or 207 is merely a storage area into which information is written and from which selected information may be accessed by the routing function. An example of a routing table is shown in Table 1.

The topology data base 105 and link status table 208 are additional storage areas into which selected information is written and from which selected information may be accessed. The collection of topology data bases of all NC's is the source of information from which routing tables 107 and 207 are written. The link status table 208 is the source from which information is extracted to form the basis of messages to owner NC's.

The Local Topology Monitor 103 or 203 is the component of a node which maintains the status of the communication links from this node to all other directly adjacent nodes. Initially, it obtains knowledge of the existence of communication links through operator definition or by having intelligent communications adapters making themselves known during a power-up sequence. Subsequent additions or deletions of communication links are made known to the Local Topology Monitor in similar fashion.

Once active with definitions of the local communication links available, the Local Topology Monitor is responsible for beginning, monitoring, and terminating communication with adjacent nodes. The beginning phase of communications is highly dependent on the link technology. Upon operator request or as a part of normal operation for that link, the Link Topology Monitor actively seeks to establish a connection to an adjacent node. Successful connection to an adjacent node causes procedures detailed below to occur.

In the monitoring phase after successful connection has been established to either an ordinary node or a control node, the Link Topology Monitor constantly examines the characteristics of each link to detect changes in link weight. An example of a cause for such a change might be a significant increase in transmission delay over a link due to heavy traffic. Weight changes for a link cause procedures detailed below to occur.

In the terminating phase, link communication has ceased. The cause for cessation could range from an orderly shutdown by the adjacent nodes to a sudden failure of the link. The loss of a communication link and possible ownership session losses cause procedures detailed below to occur.

All changes—activation, weight changes, termination—are retained by the node. An ordinary node retains this information in its Link Status Table, whereas a control node retains this information in its broader Topology Data Base.

The domain topology monitor 104 is similar to the local topology monitor 103 or 203 except that its scope is the entire domain rather than merely directly adjacent topology.

The procedures described below (FIGS. 5-18) are implemented in the local topology monitor 103 and the domain topology monitor 104.

Since an NNC does not maintain a topology data base, it is unable to compute all complete paths which may be required for routing. Therefore, each NNC must associate itself with a NC in order to request path information for establishing communication between its applications and the applications in another node. The NC to which an NNC associates itself is said to be the owner of that NNC, and the communication of topology information between an NNC and its owning NC uses an ownership path previously established by that NC. An NC uses its own topology data base for its path determination.

The NC and the associated NNCs (if any) which use its topology data base are called the domain of that NC. The arbitrary topology of FIG. 1 shows domain boundaries (dotted) for one possible association of NNCs with NCs.

Figure 4:
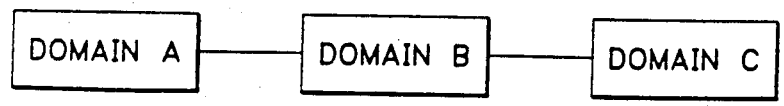
FIG. 4 illustrates schematically interconnection of domain conforming to the network of FIG. 1.

The NCs and their associated domains form a virtual network of NCs, where the nodes of the network are the NC domains. A connection between nodes of this virtual network exists when there is an established communication path between NCs for the purpose of exchanging topology information. Such communication paths are established whenever two domains are adjacent; that is, whenever there is a single communications link connecting a node of one domain to a node in another. In FIG. 4, a virtual network of the domains identified in FIG. 1 is depicted.

In a hybrid network with automatic update of topology:
(1) Each node monitors its local topology,
(2) An owning NC is established for each NNC,
(3) Each NC learns and maintains the topology of its domain (NNCs and connections),
(4) Each NC in the virtual network of NCs exchanges domain topology information with other NCs in order to establish a complete network topology data base in each NC.
(5) All the above conditions are established/reestablished upon changes (new additions of connections or nodes, changes in status of existing connections or nodes).

Some of the advantages of a hybrid network with automatic update of topology are:
  The network is insensitive to the order in which nodes are introduced. Communication is possible among any subset of nodes which are connected and include at least one NC.
  New nodes and links may be introduced without disrupting the existing network.
  The network can tolerate failures of nodes and links, and still be able to establish communication among any subset of nodes which remain connected and include at least one NC.
  Multiple NCs are supported, relieving the network of having any single node whose failure would prevent new communication paths from being established.

SUMMARY OF HYBRID NETWORK OPERATION

Maintaining Local Topology

Each node monitors its own links. When a new link is activated, a node exchanges and retains ownership information about its new neighbor.

Establishing Ownership

An NC is owned by itself.

An NNC establishes an owning NC as follows: When NNC i first comes up or loses its owner because of outage of the ownership path, it informs its neighboring nodes of this situation. If a neighboring node j has an owning NC, it communicates this information to its owning NC, who in turn attempts to establish an ownership path at NNC i. The NC whose attempt arrives first to NNC i is selected as the owner of NNC i. If on the other hand, the neighboring NNC j is not owned, NNC j saves the knowledge that NNC i is not owned. Subsequently, when it becomes owned, NNC j notifies its new owning NC that NNC i is not owned. The NC that owns NNC j can now attempt to establish ownership of NNC i. If and when NNC i becomes owned, it informs its neighbors (j) of its owner. If j is owned it reports on i's owner to j's owner.

Acquiring Domain Topology

All changes in topology and all changes in connection characteristics within a domain must be recorded by the NC of the domain. Changes in resources adjacent to the NC are recorded locally by the NC, and changes in resources adjacent to NNC nodes in the domain of the NC are reported to the NC by the NNC using the ownership path. The NNC reports the status of all its connections on any change to a single connection. In addition, it forwards the cause of its report (new resource, failed resource, or change in characteristics of a resource) and its local time stamp as a sequence identifier.

Establishing Communication Across Domains

Part of the domain topology information retained by a NC is the identification of nodes adjacent to its domain which are owned by another NC, and the identification of the owning NC. Through this information, the NC of a domain establishes communication with each NC of adjacent domains at the earliest possible point. The path used by this communication consists of three parts:
1. The path to a node in the NC's domain which is adjacent to the other domain. This path could be just the NC itself if the NC is adjacent to the other domain.
2. The link connection between the domains.
3. The path from the adjacent node in the other domain to its owning NC along that ownership path.

The routing tables of the nodes along this three part path are updated to allow subsequent communication between the NCs of each domain. This communication path between the two NCs is considered a link in the virtual network of NCs.

In order for each NC to obtain knowledge of the complete network topology, it is necessary for it to exchange domain topologies with all other NCs. Hence, an NC having a change in the topology of its domain broadcasts the topology of its entire domain to each adjacent NC in the virtual network of NCs. These adjacent NCs broadcast the received topology to each of their adjacent NCs in the virtual network of NCs, and so forth until each NC has received the notification.

Error Recovery Situations

The loss of a connection between two nodes is reported to the domain's NC. If a portion of the domain is no longer connected with the portion controlled by the NC of the domain, the lost portion of the domain is removed from the domain topology at the NC receiving this information. The resulting domain topology is broadcast to all adjacent NCs in the virtual network of NCs.

Upon recovery of a connection, the normal bring up procedures are followed. This includes the establishment of an owner for each unowned NNC in the recovered portion and the establishment of communication paths to the NCs in any newly adjacent domains. If the disconnected portion still had connections to other domains, other NCs may have assumed ownership of the nodes before the reestablishment of a connection from the NC of the prior domain.

Detailed Description of Hybrid Network Operation

In the detailed description below, certain notations are used. Lower case letters (e.g., i, j, k) signify NNCs, while upper case letters (e.g., J, K, M) signify NCs. In cases where the node could be either, lower case letters are used.

The term OWNER(i) refers to the current owning NC of node i. The owner of an NC is the NC itself. If node i has no owner, the OWNER(i) is "NONE".

Node Data Bases

Each NC or NNC maintains a routing table 107 or 207 consisting of information to support transmittal of packets to destinations in the network. Table 1 is a sample of an implementation of a routing table which assumes each packet carries both the identification of the origin of the packet and the ultimate destination. Through the routing table, the next node to which the packet should be forwarded is identified.

TABLE 1

| Sample Routing Table for NNC a Node NNC a | | |
|---|---|---|
| Origin Node | Destination Node | Next Node |
| A | b | c |
| b | A | A |
| A | d | B |
| d | A | A |
| . | . | . |
| . | . | . |
| . | . | . |

Table 2 depicts a topology data base of a typical NC (NNCs do not have topology data bases). For each node in the network, the topology data base has that node's identification, the owner of that node, the identification of each link for that node, the weights associated with the link, the adjacent node's identification, and the owner of that adjacent node. In addition a sequence number is kept for each node to aid in identifying old or duplicate topology information.

TABLE 2

| Sample Topology Data Base for NC A Node NC A | | | |
|---|---|---|---|
| Node (Owner) | Adjacent Node (Owner) | Link Weight | Sequence Number |
| A(A) | a(A) | 9 | 5 |
| A(A) | B(B) | 4 | 5 |
| a(A) | A(A) | 9 | 2 |
| a(A) | B(B) | 7 | 2 |
| a(A) | c(B) | 4 | 2 |
| B(B) | A(A) | 4 | 9 |
| B(B) | a(A) | 7 | 9 |
| B(B) | b(B) | 6 | 9 |
| . | . | .. | . |
| . | . | . | . |
| . | . | . | . |

A link status table 208 maintained by each NNC. The complete link status table for NNC a is shown in Table 3. Only information about the local links is retained in the link status table, which is a subset of the topology data base.

TABLE 3

| Sample Link Status Table for NNC a Node NNC a | | |
|---|---|---|
| Node (Owner) | Adjacent Node (Owner) | Link Weight |
| a(A) | A(A) | 9 |
| a(A) | B(B) | 7 |
| a(A) | c(B) | 4 |

Message Formats

Before detailing the automatic updating of a hybrid network, the formats of the messages exchanged between nodes are described.

General: All messages are preceded by a header record used for packet switching. Each header record has both the origin node and destination node identified. Also, there is a unique identifier for each message type. Appended to the header is the message content.

OWNER(i) Message: This message identifies node i and the current owner of node i, OWNER(i). It carries a time stamp for sequence identification.

Link Status Table Message: This message is sent from NNC i to its owning NC J. The message describes the event which caused this report, and carries a copy of the entire current link status table of NNC i, plus a time stamp for sequence identification.

Topology Data Base Message: This message is sent from NC I to NC J. The message carries the entire topology data base of NC I, sorted by domain. Included in the domain information is the individual time stamps for sequence identification of each domain's information.

RQST OWNER Message: This message is sent from NC I to NNC j requesting (or inviting) that NC I become the owner of NNC j or that NNC j join the domain of NC I. The proposed ownership path is identified in the message. The OWNER(j) message is sent in reply if NNC j accepts.

The following events occur for a typical node such as NNC i:
1. NNC i is initialized (FIG. 5).
2. Link to node j is activated with weight W (FIG. 6).
3. Link to node j is deactivated (FIG. 7).
4. Link to node j changes weight to W (FIG. 8).

5. NNC i receives RQST OWNER(i)=K message (FIG. 9).
6. NNC i lost its ownership path (FIG. 10).
7. NNC i receives OWNER(j)=K message (FIG. 11).

Figure 5:
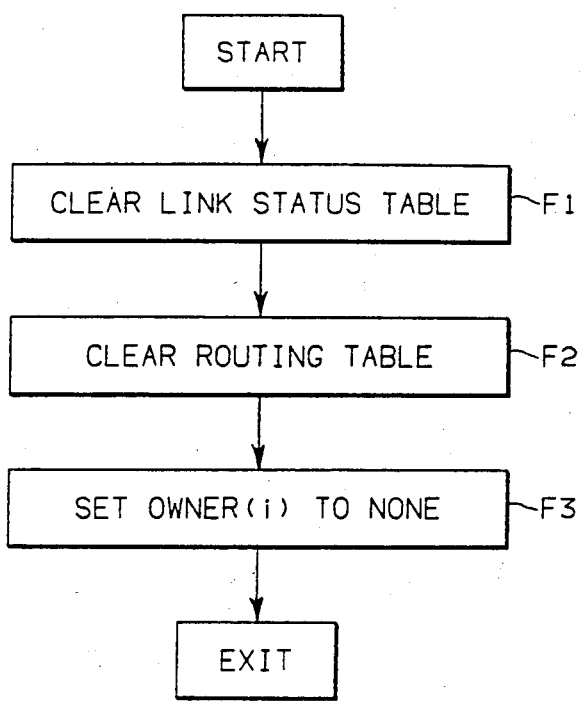
FIGS. 5–11 are flow diagrams of the processes performed at an ordinary node in response to various conditions, in accordance with an implementation of the invention.

Referring now to FIG. 5, the functions performed on initialization of a NNC are illustrated as including F1-F3. The first function (at F1) clears the link status table 208 (see FIG. 3). Function F2 clears the routing table 207 (see FIG. 3) and function F3 sets the identification of the owner to none or null.

Figure 6:
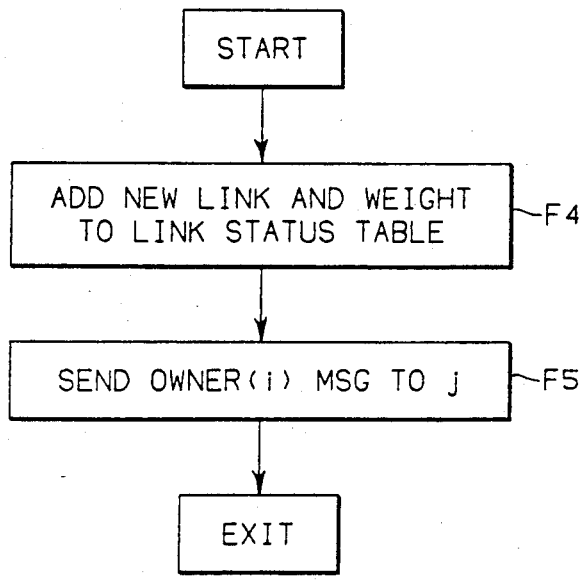

FIG. 6 shows the events that occur at a typical NNC when a link from that node to an adjacent node j is activated with weight W. Function F4 adds an identification of the new link and its weight to the link status table 208. Function F5 transmits a message indicating the owner of the node i to the neighboring node j.

Figure 7:
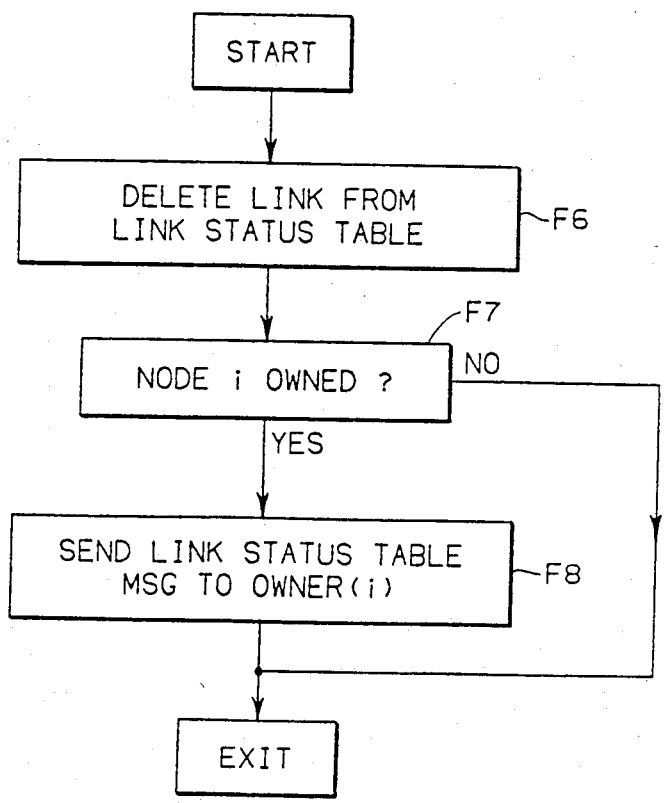
Figure 8:
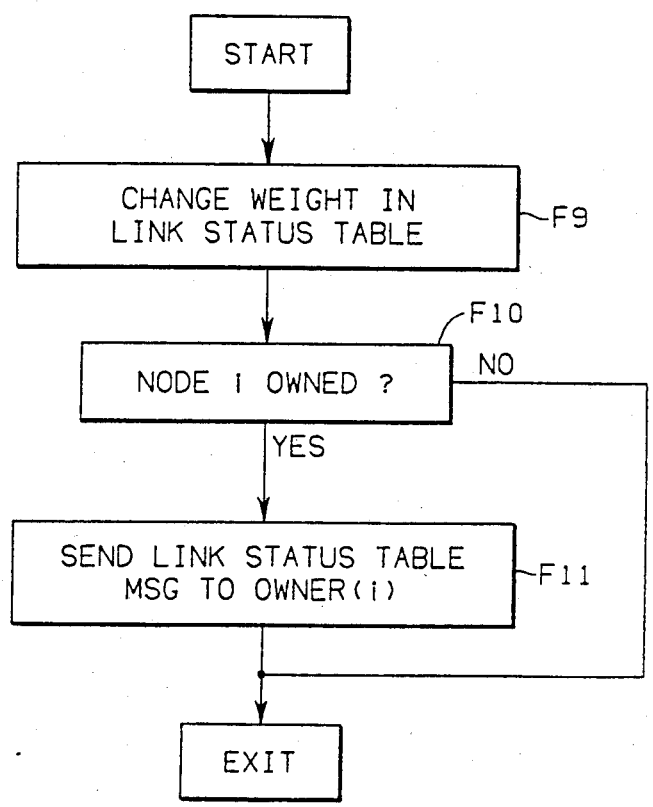

FIG. 7 shows the events which occur at a typical NNC when a link to a neighboring node is deactivated. Function F6 deletes the identification of that link from the link status table 208. Function F7 determines if the node at which the event is occurring (node i) is owned. If it is not, no further action is necessary. On the other hand, if there is an owner, then F8 sends a link status table message (identifying the remaining information in the link status table 208) to the owner.

FIG. 8 shows the events that occur at a node i when a link to a neighboring node changes weight W. Function F9 changes the entry in the link status table 208 to reflect the new weight for this link. Functions F10 and F11 are similar to functions F7 and F8 of FIG. 7.

Figure 9:
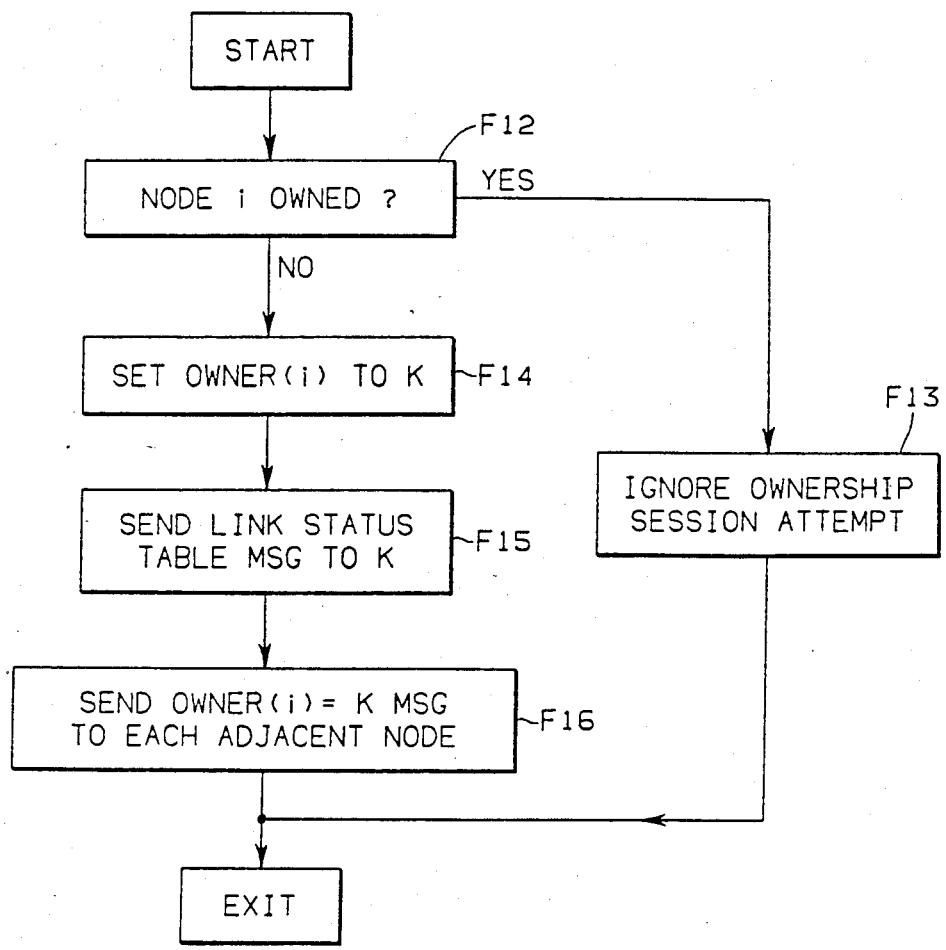

FIG. 9 shows the events which occur at a typical NNC i on receipt of a message from a control node requesting ownership. Function F12 determines if the node is already owned. If it is, function F13 is performed to essentially ignore the message. On the other hand, if the node i is not owned, then functions F14-F16 are performed. Function F14 writes a new entry defining the ownership for the node i. Function F15 transmits the contents of the node's link status table 208 to the now owning node K. Function F16 identifies the new owner of the node i to each adjacent node.

Figure 10:
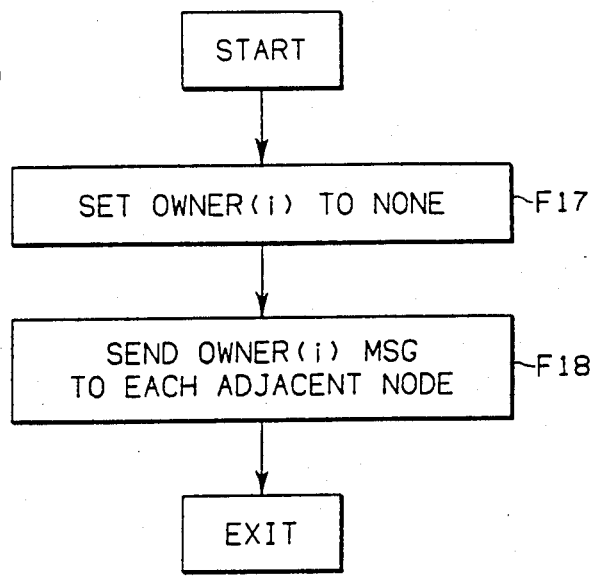
Figure 11:
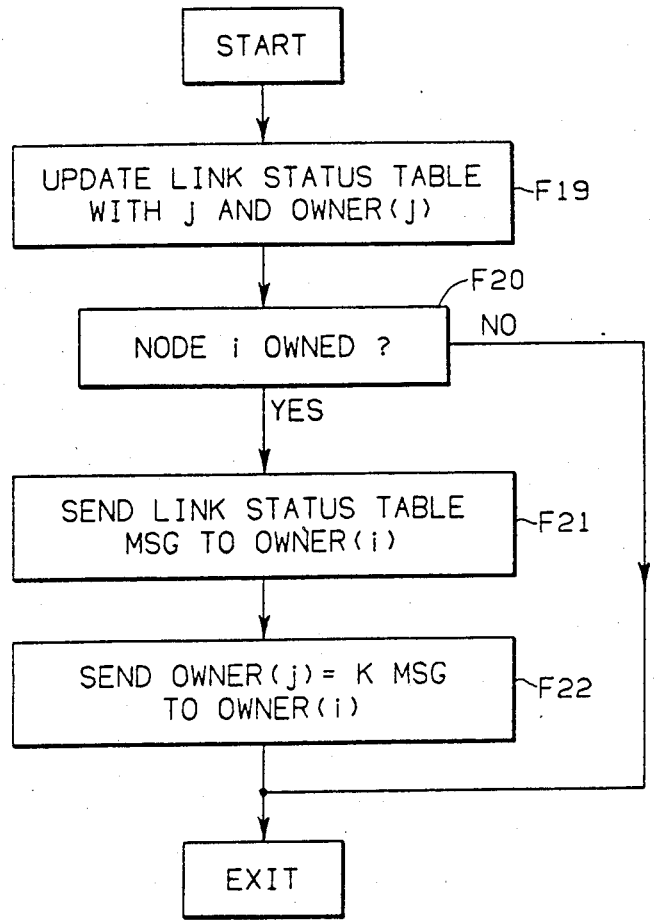

FIG. 10 shows the events which occur at a typical NNC i in the event that the communication path between it and its owner is disabled. This event could be triggered by the disablement of the control node, or any other node or link between the NNC i and the owning node. Function F17 rewrites the identification of the node's owner as none. Function F18 sends the ownership message indicating that node i is no longer is owned, to each adjacent node.

FIG. 11 shows the events which occur at a node receiving a message from an adjacent node as to the adjacent node's ownership. Function F19 updates the link status table 208 with this new information. Function F20 determines if the node i is owned, and if not, no other operation is necessary. On the other hand, functions F21 and F22 are performed to transmit the contents of the link status table 208 of node i to its owner, as a result of the change in the contents of the link status table (F19). Function F22 transmits an ownership message identifying the owner of node j, to the owner of the node i.

NC Events and Actions

Figure 18:
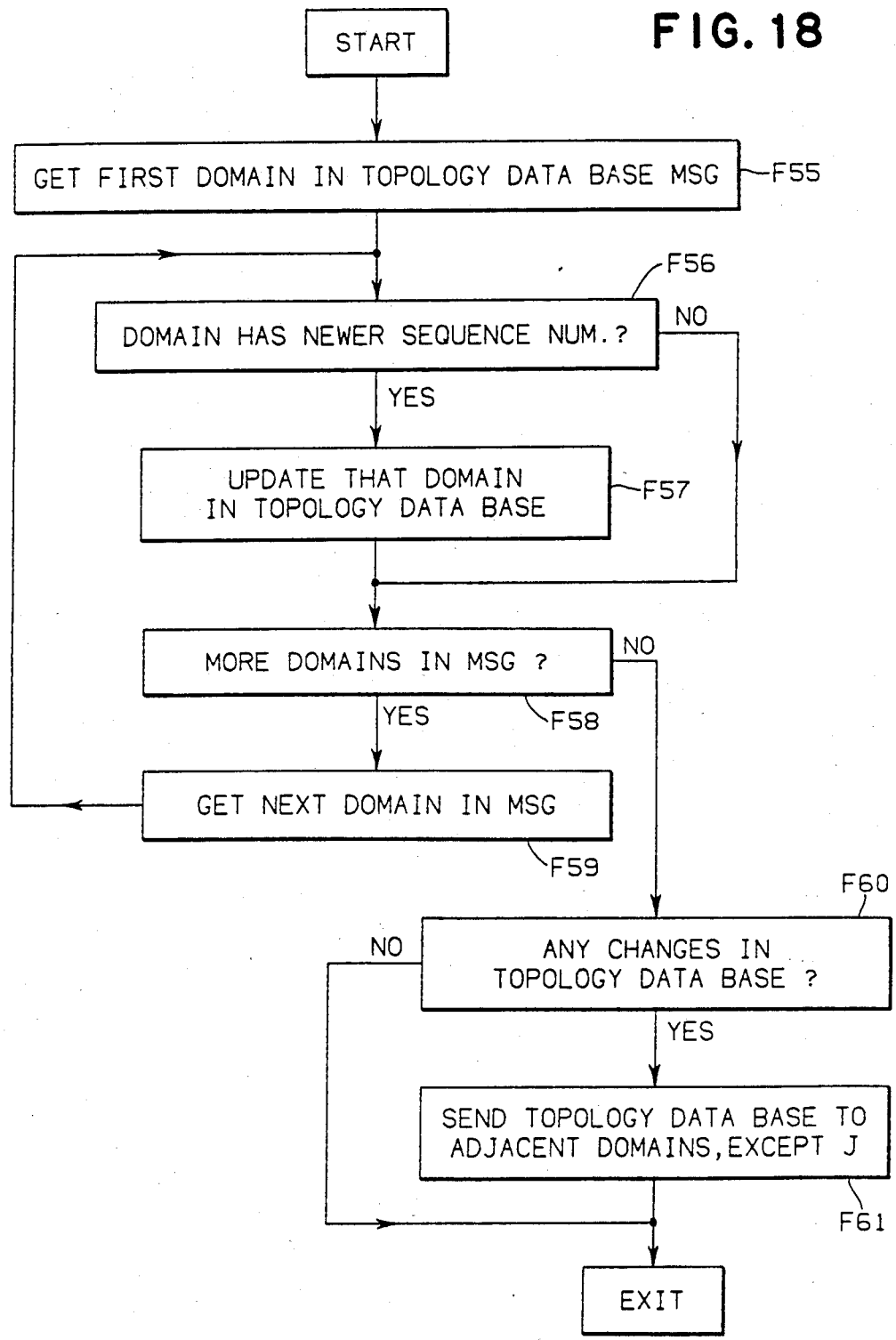

The following events occur for the typical NC I:
1. NC I is initialized (FIG. 12).
2. Link to node j is activated with weight W (FIG. 13).
3. Link to node j is deactivated (FIG. 14).
4. Link to node j changes weight to W (FIG. 15).
5. NC I receives OWNER(j) Message (FIG. 16).
6. NC I receives Link Status Table Message from NNC j (FIG. 17).
7. NC I receives Data Base Topology Message from NC J (FIG. 18).

Figure 12:
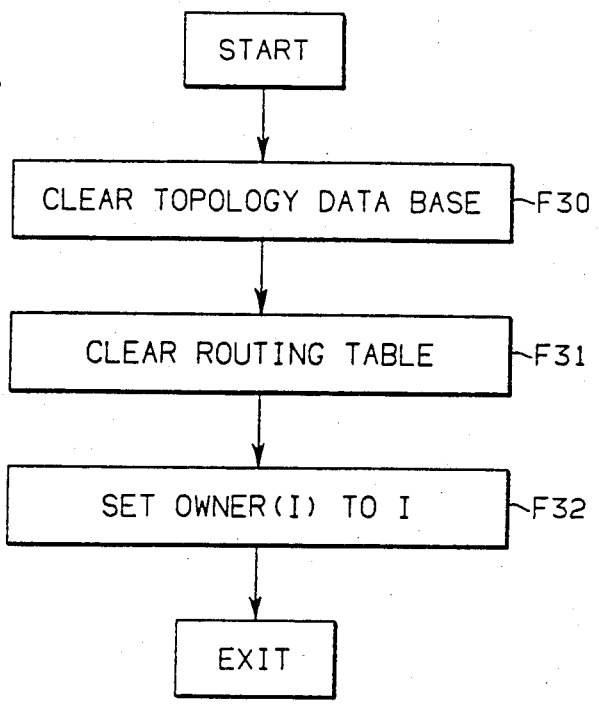

FIG. 12 shows the events occurring at a control node on its initialization. Function F30 clears the topology data base 105, function F31 clears the routing table 107 and function F32 identifies the ownership of this node, as itself.

Figure 13:
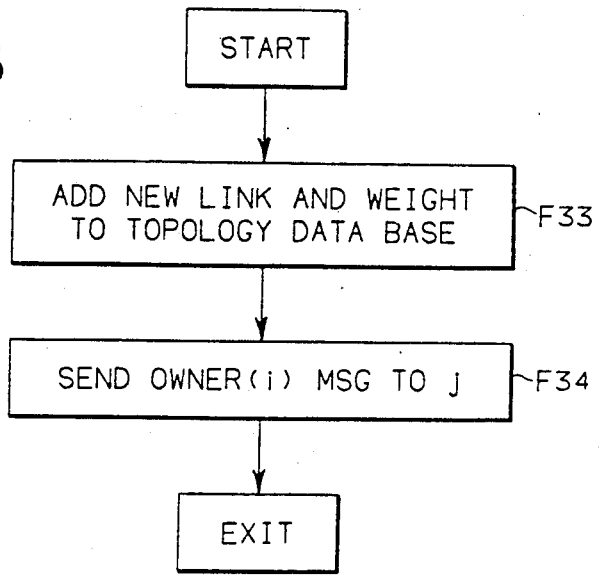

FIG. 13 shows the events which occur at a control node when a link to an adjacent node j is activated with a particular weight. Function F33 adds the new link and its weight to the topology data base 105. Function F34 sends a message indicating the ownership of the control node to the node j.

Figure 14:
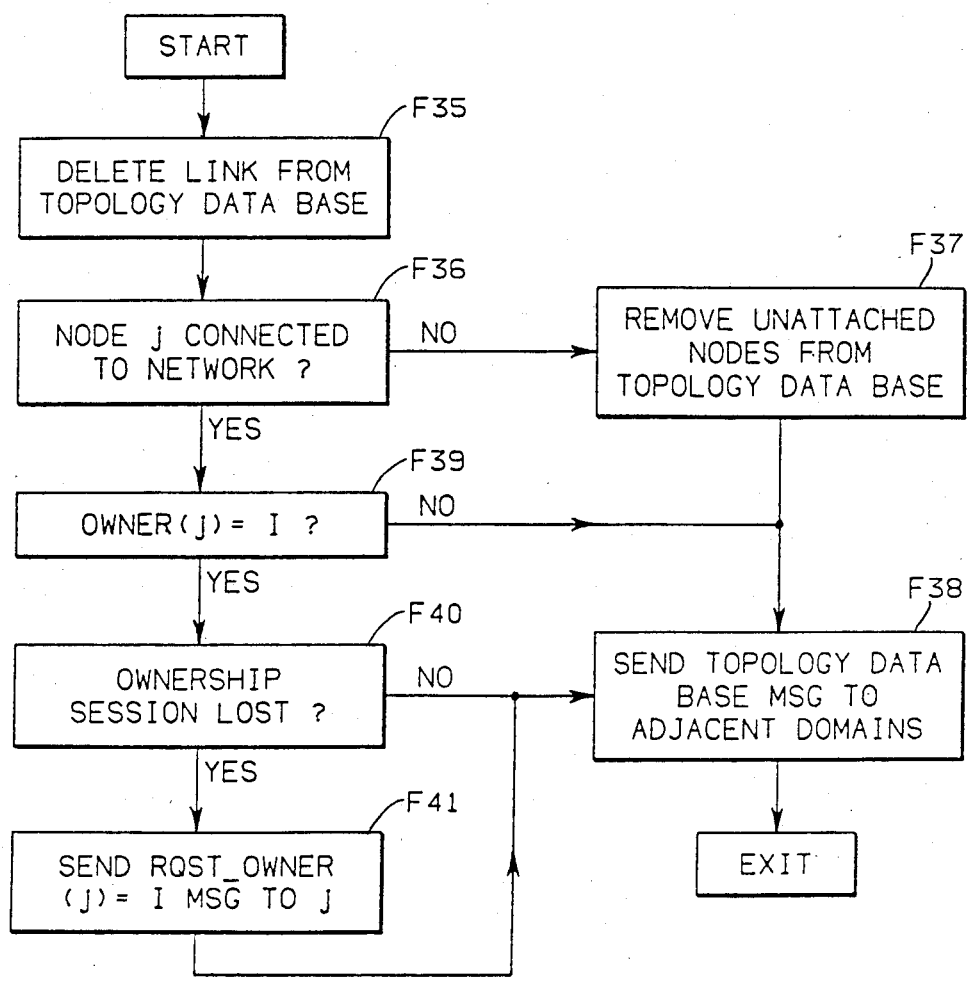

FIG. 14 shows the events which occur at a control node when a link to an adjacent node j is deactivated. Function F35 deletes the link from the topology data base 105. Function F36 determines if the node j is connected to the network through other links, this can be accomplished by reference to the topology data base 105. If there are no other links connecting node j to the network, then function F37 is performed to remove node j from the topology data base and function F38 is performed to send the topology data base, as now modified, to adjacent domains.

On the other hand, if node j were still connected, function F39 determines if the control node at which these events are occurring (I) is the owner of node j. If not, function F38 is effected to inform other domains of deactivation of the particular link.

On the other hand, if the node I is the owner of node j, then function F40 determines if the ownership session has been lost. If the ownership session is still up (via a link other than the one which had been deactivated) then function F38 is performed. If the ownership session has been lost (because the ownership session path to the node j included the deactivated link), function F41 sends a request to become the owner from the node I to the node j via a different link. Following function F41, function F38 is performed.

FIG. 15 shows the events which occur at a control node I when a link to node J changes weight. Function F42 changes the link weight in the topology data base 105. Function F43, as a consequence of the change of the data in the topology data base 105 communicates the contents of the topology data base 105 to adjacent domains.

Figure 16:
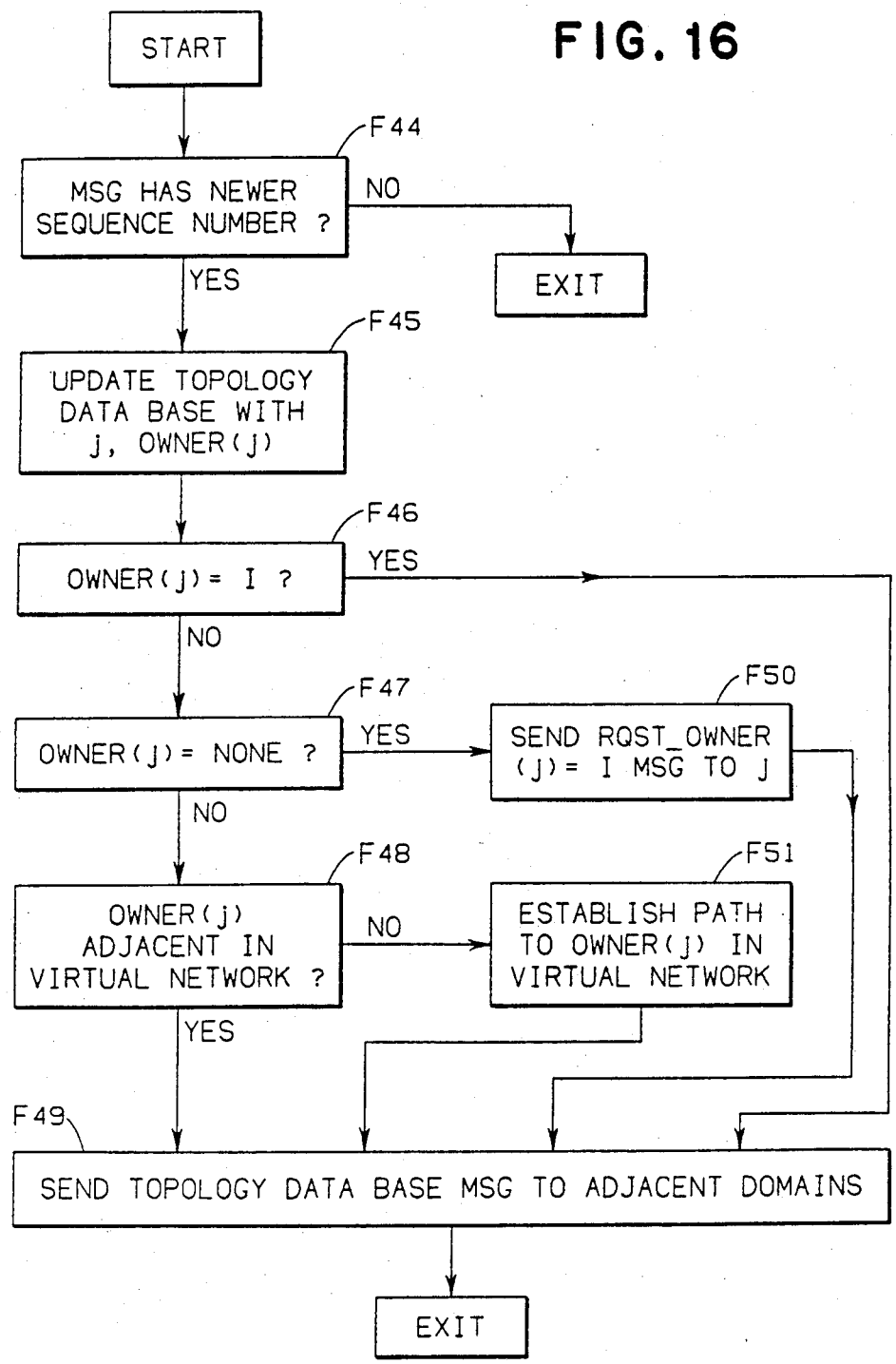

FIG. 16 shows the events which occur at a control node I when it receives a message indicating the ownership of a node j. Function F44 compares the time stamp or sequence number of the message with the sequence number in the topology data base 105. If the message's sequence number indicates it is earlier than or the same as data already in the topology data base 105, the information can be disregarded and no other events occur, e.g. the message is ignored.

On the other hand, if the message time stamp shows the message is later than data in the topology data base, function F45 will update the topology data base 105 with the information contained in the message. Function F46 checks to see if the owner of the node j is the control node at which these events are occurring. If that is the case, function F49 is performed to communicate the change in the topology data base of the control node I, to adjacent domains. On the other hand, if the owner of node j is not the control node I, then function F47 checks to see if the node j is owned at all. If the node j is not owned, then function F50 is performed to attempt to obtain ownership of the node j. Following transmission of the request ownership message, function F49 is performed.

On the other hand, if the owner of node j is a different control node, then function F48 is performed to determine if the control node which is the owner of node j is adjacent in the virtual network to the control node I at which these events are occurring. If it is, then function F49 is performed. On the other hand, if the owner of the node j is not adjacent to the node I in the virtual network, then function F51 establishes a path to the owning node in the virtual network and function F49 is performed.

FIG. 17 shows the events occurring at a control node I on receipt of a link status table message from NNC j. Function F52 compares the sequence number or time stamp with link status table information previously received from node j in the topology data base 105. If the message's sequence number is not newer, then the message is ignored. On the other hand, function F53 will modify the topology data base 105 with a new line data of status table from the node j. As a consequence of the change in the contents of the topology data base 105, function F54 is performed to transmit this information to adjacent domains.

Finally, FIG. 18 illustrates the events occurring at a control node I receiving a topology data base message from a different control node J. Function F55 isolates that portion of the message relating to the first domain in the message. Function F56 compares the sequence number associated with this information with the sequence number of the corresponding information existing in the topology data base 105. If the sequence number existing in the data base is more recent than the information in the message, then this portion of the message can be ignored and function F57 is skipped. On the other hand, if the information in the isolated portion in the message is more recent than the information in the topology data base 105, then function F57 is performed to update the topology data base 105 with respect to the domain's information. Function F58 determines if there is information in the message concerning a different domain. Assuming there is, function F59 isolates that portion of the message respecting the next domain and functions F56 and F57 are again performed. In effect functions F56, F57, F58 and F59 form a loop to repeatedly isolate information respecting a domain in the message and compare that data to the corresponding information existing in the topology data base 105. More current information is recorded, older information is discarded. When the entire message has been processed in this fashion then function F60 determines if any changes have been made to the topology data base 105. If no changes have been made no other function is necessary. On the other hand, if one or more changes have been made in the topology data base, then function F61 is performed to transmit the contents of the topology data base to all adjacent domains except the domain J from which the message was received. This transmission could include either the entire topology data base or only that portion of the topology data base which was altered by function F57.

It should be apparent from the foregoing that these processes meet the requirements initially specified, e.g.:

1. After some finite time all connected ordinary nodes will exist in one and only one domain and have an active session with their owning control node, so that routing information necessary at an ordinary node can be retrieved from an identified control node through an identified and active path,
2. Any change in the status of the network (activation or deactivation of either a link or a node) which is sensed by an ordinary node will be firstly communicated to the owning control node, and if that information is new to the control node, it will be communicated to adjacent domains. In this fashion, current topology information will tend to propagate throughout the entire network, and
3. In the event that failure of a node or a link terminates an ownership session, a new ownership session will be initiated with either the same or a different controlling node in the event that the original control node or a link in the path included in the original ownership session has been deactivated, or a new ownership session will be initiated once an ordinary node which had been deactivated, is reactivated.

Figure 19:
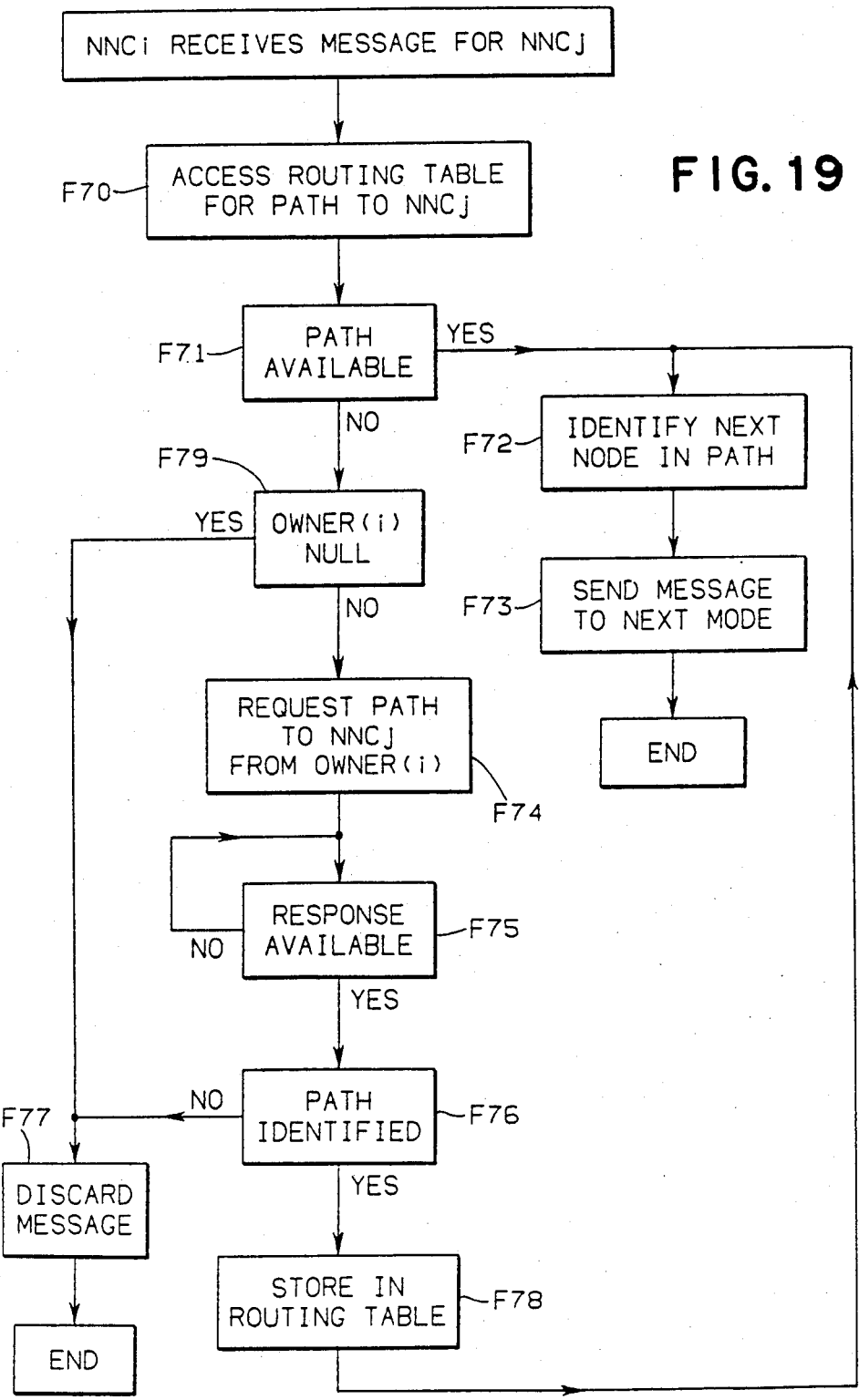
FIG. 19 shows the routing process at a typical ordinary node.

The purpose for maintaining a topology data base in the control node and continuous identification of an ownership session between each ordinary node and its owner is for the purpose of routing messages. The advantage of the invention is that the extensive topology data base need not be maintained at each ordinary node. Thus, when a message is received at NNC i (a typical ordinary node), for transmission to NNC j, node i may not have routing information for that particular message. FIG. 19 illustrates the procedure for message routing at a typical node i. The procedure is entered when a message is received identifying the destination node j. Function F70 accesses node i's routing table to identify the path to node j. Function F71 determines if a path is available. If it is, function F72 isolates the next node in the path and function F73 transmits the message to the thus identified node.

In the event that the routing table of node i does not contain a path to node j, then function F79 is performed to identify owner (i). If node i is not owned, then function F77 is performed to discard the message, since it cannot be routed. On the other hand if owner (i) exists, then function F74 is performed to request the path. Function F75 determines if the response from owner (i) is available. When it is function F76 determines if that response identifies the path. If the response does not identify the path, then function F77 is performed to discard the message, since it cannot be routed. Alternatively, if the path is identified in the response from owner (i), then function F78 stores the path in the routing table of node i. Subsequently, functions F72 and F73 are performed to identify the next node in the path and transmit the message to or at least toward that particular node.

Having thus described our invention, what we claim as new, and desire to secure by Letters Patent is:

1. A method of maintaining a topology data base which is available for message routing in a dynamic, hybrid mesh connected network including at least one control node and a plurality of ordinary nodes, said method comprising the steps of:

(a) maintaining in each of said ordinary nodes a link status data base identifying directly connected nodes, and
(b) maintaining in each of said control nodes a topology data base, by:
  (i) establishing one or more domains of nodes, each such domain including only one control node,
  (ii) communicating network status information from an ordinary node to the single control node of its domain in response to a change in network status sensed by said ordinary node, and
  (iii) altering the topology data base at said control node in response to information transmitted by said ordinary node,
whereby each said control node is informed of network status changes adjacent to any node in its domain.

2. The method of claim 1 wherein said step (i) comprises:
  (ai) transmitting a message from an ordinary node, not included in any domain, to a neighboring node indicating the exclusion of said transmitting node from any domain,
  (bi) at said neighboring node, transmitting the information received in step (ai) to the single control node in the domain of the neighboring node or if the neighboring node is not within a domain storing the received information until such time as the neighboring node joins a domain,
  (ci) at a control node receiving the message of step (bi), transmitting an invitation to said ordinary node inviting said ordinary node to join the domain of the transmitting control node,
  (di) on receipt of the message of step (ci) at the ordinary node, altering its status to be within the transmitting control nodes domain by storing the identity of the transmitting control node as the owner of the ordinary node and transmitting a message to the transmitting control node acknowledging acceptance of the invitation.

3. The method of claim 1 in which said step (i) comprises:
  (ai) transmitting a message from an ordinary node, not included in any domain, to each neighboring node indicating the exclusion of said transmitting node from any domain,
  (bi) at each said neighboring node, transmitting the information received in step (ai) to the single control node in the domain of each neighboring node,
  (ci) at any control node receiving the message of step (bi), transmitting an invitation to said ordinary node inviting said ordinary node to join the domain of the transmitting control node,
  (di) on receipt of the message of step (ci) at the ordinary node, altering its status to be within the domain of the particular control node whose message is first received by storing the identity of the particular control node as the owner of the ordinary node, transmitting a message to the particular control node acknowledging acceptance of the invitation and on receipt of each other step (ci) message transmitted by other control nodes, ignoring each said message.

4. The method of claim 2 or 3 which includes the further step of transmitting to each neighboring node of the ordinary node an indication that the ordinary node is now within an identified domain.

5. The method of claim 1 in which said step (b) includes:
  (bi) identifying at each control node those other control nodes adjacent the domain of the control node,
  (bii) repeating to said other control nodes at least the information communicated to said control node by said ordinary nodes in the domain of said control node respecting network status changes,
whereby all said other control nodes are informed of said network status changes to thereby maintain an accurate topology data base in all said other control nodes.

6. The method of claim 1 in which said link status data base in each of said ordinary nodes includes information identifying the control node of the domain of each adjacent ordinary node.

7. The method of claim 1 in which said step (i) includes the steps of:
  (ai) at each control node identifying an ownership session as a particular set of ordinary nodes through which messages to a particular ordinary node within the domain of the control node are transmitted,
  (aii) in response to information received at any control node that a particular ownership session to said particular ordinary node is now unavailable deleting said unavailable ownership session from said topology data base,
  (aiii) deriving from said topology data base another set of nodes through which messages may be sent to said particular ordinary node,
  (aiv) transmitting an invitation to said particular ordinary node over said another set of nodes, and
  (av) if another set of nodes to said particular ordinary node is not contained within said topology data base, then instead of steps (aiii) and (aiv) deleting said particular ordinary node from said topology data base.

8. The method of claim 1 in which said link status data base and said topology data base each include for each pair of adjacent nodes, an efficiency factor for transmissions between the adjacent nodes.

9. The method of claim 8 in which communicated network status information includes changes in node adjacency or efficiency and is accompanied by a time stamp related to the time at which a particular change has occurred.

10. The method of claim 9 in which said step (b) includes:
  (bi) identifying at each control node those other control nodes adjacent the domain of the control node,
  (bii) repeating to said other control nodes at least the information communicated to said control node by said ordinary nodes in the domain of said control node respecting network status changes,
whereby all said other control nodes are informed of said network status changes to thereby maintain an accurate network wide topology data base in all said other control nodes.

11. The method of claim 10 in which said step (bi) includes transmitting the time stamp received from the transmitting ordinary node and which includes the further step of:
  (biii) updating the topology data base at one of said other control nodes by comparing the received time stamp with the corresponding time stamp in its topology data base to determine which of the received or corresponding network status information is more current.

12. The method of claim 10 in which said step (bi) includes transmitting the time stamp received from the transmitting ordinary node and which includes the further step of:
(biii) updating the topology data base at each of said other control nodes by comparing the received time stamp with the corresponding time stamp in its topology data base to determine which of the received or corresponding network status information is more current.

13. A method of routing a message at an ordinary node in a dynamic, hybrid mesh connected network which comprises the method of claim 1 and the additional steps of:
(c) acquiring routing information from the control node of the domain including said ordinary node, and
(d) routing said message from said routing information.

14. A method of maintaining a topology data base in a dynamic, hybrid mesh connected network including at least one control node and a plurality of ordinary nodes, said method comprising the steps of:
(a) maintaining in each of said ordinary nodes a link status data base identifying only directly connected nodes, and
(b) maintaining in each of said control nodes a topology data base, by:
  (i) identifying at each control node those other control nodes adjacent the control node,
  (ii) repeating to said other control nodes at least network status change information derived at said control node,
  whereby all said other control nodes are informed of said network status changes to thereby maintain an accurate topology data base in all said other control nodes.

15. The method of claim 14 in which said step (ii) includes:
(iia) establishing one or more domains of nodes, each such domain including only one control node,
(iib) communicating network status information from an ordinary node to the single control node of its domain in response to a change in network status sensed by said ordinary node, and
(iic) altering the topology data base at said control node in response to information transmitted by said ordinary node.

16. A method of routing a message at an ordinary node in a dynamic, hybrid mesh connected network which comprises the method of claim 15 and the additional steps of:
(c) acquiring routing information from the control node of the domain including said ordinary node, and
(d) routing said message from said routing information.

* * * * *